L. L. SALFISBERG.
TRACTOR.
APPLICATION FILED MAY 22, 1916.
1,235,249.
Patented July 31, 1917.
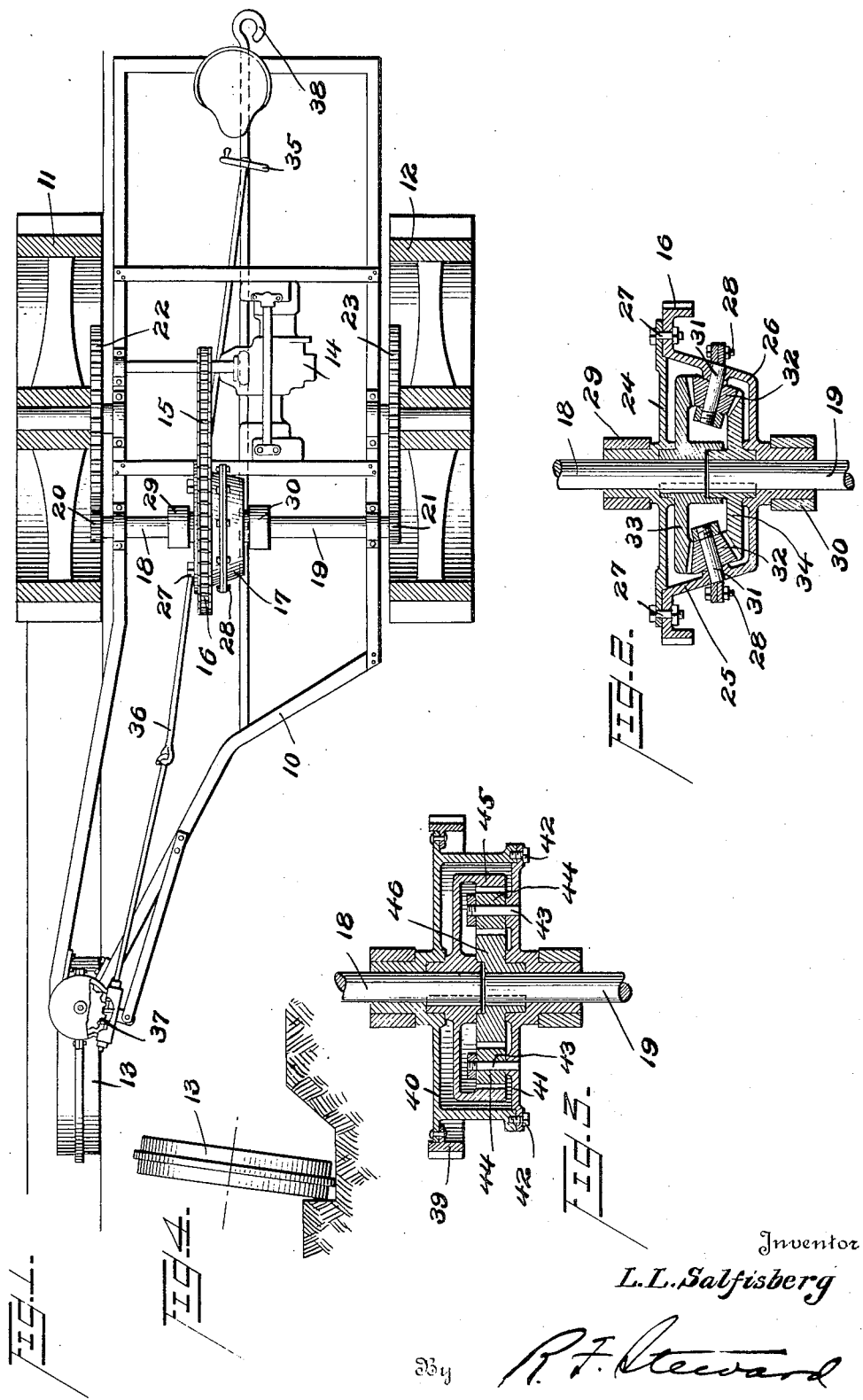
Inventor
L. L. Salfisberg
By R. F. Steward
Attorney

UNITED STATES PATENT OFFICE.

LEROY L. SALFISBERG, OF PLANO, ILLINOIS, ASSIGNOR TO GRAY PLANO COMPANY, OF PLANO, ILLINOIS, A CORPORATION OF ILLINOIS.

TRACTOR.

1,235,249.  Specification of Letters Patent.  Patented July 31, 1917.

Application filed May 22, 1916. Serial No. 99,160.

*To all whom it may concern:*

Be it known that I, LEROY L. SALFISBERG, a citizen of the United States, residing at Plano, in the county of Kendall and State of Illinois, have invented certain new and useful Improvements in Tractors; and I do hereby declare the following to be a full, clear, and exact description of the invention, such as will enable others, skilled in the art to which it appertains to make and use the same.

This invention relates to tractors, and especially to farm tractors of a type suitable for use with a plow or a gang of plows. More particularly the invention contemplates a tractor capable of being substantially self-steering when used with a plow and which, in addition, possesses certain other important advantages over tractors heretofore proposed.

A tractor embodying the invention comprises a suitable power plant mounted on a supporting framework which is carried on two drive or bull wheels at the rear, and a steering wheel in front, one of the bull wheels and the steering wheels being arranged to track and to travel in a furrow. The present improvements have to do with a tractor of this general character in which gearing, interposed between the power plant and the bull wheels, is arranged to transmit power unequally to the bull wheels, that is, to transmit more power to the bull wheel traveling in the furrow; whereby the tractor, if left to itself, tends to turn away from the furrow and toward the unplowed land, thus pressing the guide wheel laterally against the substantially vertical furrow wall, and maintaining the tractor in its proper course with practically no attention from the operator.

In addition, this unequal distribution of power to the two driving or bull wheels has the great practical advantage of enabling the attainment of a maximum tractive effect with a tractor of given weight. The reasons for this will appear more fully hereinafter.

In order to explain clearly the principles of the invention, a practical embodiment thereof is shown in the annexed drawings, in which:

Figure 1 is a more or less diagrammatic plan of a tractor within the invention, parts being shown in section;

Fig. 2 is a section showing details of the bevel gear differential on a larger scale;

Fig. 3 is a section of a spur gear differential which may be employed; and

Fig. 4 is a diagrammatic view of the steering wheel looking from the rear, illustrating how it travels in the furrow.

In the embodiment of the invention illustrated in the drawings, 10 is the main supporting frame of the tractor mounted on two driving wheels 11 and 12 at the rear, and on a steering or guide wheel 13 at the front. Bull wheel 11 on the right hand side of the tractor runs in the furrow and tracks with the steering wheel, which also runs in the furrow. A suitable source of power, in this instance an internal combustion engine, is indicated at 14, power being transmitted from the engine by suitable gearing, such as a chain and sprocket drive 15, to main gear 16 on the differential housing 17 which is loose on the two sections 18 and 19 of a divided jack shaft. Pinions 20 and 21 transmit power from the jack shaft to gears 22 and 23 which are rigidly connected, respectively, with bull wheels 11 and 12.

Referring more particularly to Figs. 2, 24, 25 and 26 represent portions of the differential housing. The parts 24 and 25 are secured together by bolts 27, and parts 25 and 26 are secured together by bolts 28. The housing is provided with bearings 29 and 30. A suitable number of studs 31 are clamped at their outer ends between the parts 25 and 26 of the housing by means of the bolts 28; and on these studs are rotatably mounted bevel pinions 32. These bevel pinions are in mesh with two master bevel gears 33 and 34, of which 33 is keyed to section 18 of the divided shaft, and bevel gear 34 to section 19 of said shaft. It is evident that when the main gear 16 is driven by the engine, the differential housing transmits power to the divided jack shaft through pinions 32, and bevel gears 33 and 34. These bevel gears being of unequal diameter, however, the total torque impressed upon the differential housing is unequally divided between the two bevel gears, more power going to bevel gear 33 which has the greater diameter. Accordingly bull wheel 11 receives more power from the engine than does bull wheel or land wheel 12, and on this account the whole tractor has a tendency to turn toward the left. So long as the steering or guide wheel is running in the furrow, however, the tractor is prevented from turning, the steering wheel merely being pressed toward the left against the vertical wall of the furrow. Under these conditions, therefore, the tractor will continue to travel with its two right hand wheels in the furrow without any attention from the operator, the manual steering gear 35, 36, 37 being idle under the conditions assumed. A plow or gang of plows (not shown) is of course supposed to be attached to the draw bar 38 at the rear of the tractor.

Not only does the described construction render the tractor positively self-steering for plowing purposes, but more efficient traction is also secured. Each driving wheel of a tractor is capable of a certain maximum traction dependent upon the weight carried by each wheel, assuming of course that sufficient power is available for development of the maximum tractive effect. When the torque on the wheel increases beyond that required for the maximum tractive effect corresponding to the weight on a wheel, the wheel begins to slip. In practice, the weight of a tractor is always more or less unequally distributed to the several wheels, more load being carried by the right hand drive wheel than by the left hand drive wheel. With an ordinary differential giving equal distribution of power, the effective pull of a tractor depends upon the weight carried by the left hand drive wheel, which is considerably smaller than that carried by the right hand drive wheel, as before explained. With the usual equal distribution differential, therefore, the tractor is incapable of exerting as large a pull as it should, considering the weight on the drive wheels. By employing the differential hereinbefore described, however, power is distributed to each drive wheel according to the weight carried thereby, and the tractive effect is therefore a maximum for any given weight carried by the drive wheels.

In Fig. 3 is illustrated a spur gear differential which may be employed in lieu of the bevel gear differential shown in Figs. 1 and 2. In this construction, 39 is the main spur gear driven from the transmission, and 40 is the main section of the differential housing to which the gear is bolted or otherwise suitably secured. Section 41 of the housing is bolted to section 40 as at 42 and carries studs 43 upon which are revolubly mounted spur pinions 44. These pinions mesh on one side with a large internal spur gear 45 keyed to the right hand section 18 of the jack shaft, and on the other side with a spur gear 46 of smaller diameter keyed to the left hand section 19 of the jack shaft. The action of this spur gear differential is the same as that of the bevel differential previously described; but it is of simpler construction and gives a wider range in the unequal distribution of power to the drive wheels.

When the tractor is traveling along a road, for example, it is of course necessary to correct the tendency of the tractor to turn toward the left by use of the manual steering mechanism shown. Where desirable, the tractor may also be equipped with an auxiliary jack shaft and differential to which the engine may be connected alternatively in place of the unequal differential above described. For the sake of simplicity, this optional modification has not been illustrated in the drawings, and for the same reason well-known details of clutch and transmission mechanism, common to motor propelled vehicles, have not been shown.

While the specific form of my invention herein illustrated and described offers particular advantages for the purposes in view, it is to be understood that such construction may be considerably varied in mechanical details without departing from the spirit of the invention, and such changes are to be understood as included within the scope of the appended claims.

What I claim is:

1. A tractor comprising, in combination, a supporting body or frame mounted on two rear wheels and a front steering wheel, a power plant carried by said frame, and gearing arranged to transmit power unequally from said power plant to said rear wheels, said steering wheel being adapted to travel in a furrow and to be pressed laterally against a wall thereof by the resultant turning tendency of the tractor.

2. A tractor comprising, in combination, a supporting body or frame, two wheels supporting the frame toward the rear, a steering wheel toward the front, a divided drive shaft geared to the rear wheels, a power plant carried by the frame, and differential gearing arranged to be driven by said power plant and to distribute power unequally to the two sections of the divided shaft, said steering wheel being adapted to travel in a furrow and to be pressed laterally against a wall thereof by the resultant turning tendency of the tractor.

3. A tractor comprising, in combination, a supporting body or frame, two wheels supporting the frame toward the rear, a steering wheel toward the front, a divided drive shaft geared to the rear wheels, a power plant carried by the frame, a main gear loose on said divided shaft, two gears of unequal diameter, each fast with a section of said divided shaft, a pinion carried by said main gear and meshing with both the other gears, and means for driving said main gear from the power plant, said steering wheel being adapted to travel in a furrow and to be pressed laterally against a wall thereof by the resultant turning tendency of the tractor.

4. A tractor comprising, in combination, a body or frame carried by two rear drive wheels and a front steering wheel with which one of the drive wheels tracks, the tracking wheels being adapted to travel in a furrow, power means, and gearing arranged to deliver power therefrom unequally to said drive wheels, the greater amount of power going to the drive wheel which tracks with the steering wheel, whereby the steering wheel tends to be pressed laterally against a wall of the furrow.

5. A tractor comprising, in combination, a body or frame carried by two rear drive wheels and a front steering wheel with which the right hand drive wheel tracks, power means, and differential gearing arranged to transmit power unequally therefrom to the drive wheels, the greater amount of power going to the right hand drive wheel, whereby said steering wheel tends to be pressed toward the left against the furrow wall.

6. A tractor comprising, in combination, a body or frame, two oppositely disposed drive wheels, a power plant mounted on the frame, transmission means adapted to distribute power unequally to said drive wheels, and guiding means arranged to travel in a furrow and to be pressed laterally against a wall thereof by the resultant turning tendency of the tractor.

In testimony whereof I hereunto affix my signature.

LEROY L. SALFISBERG.

Witnesses:
JOSEPH JANDASEK,
EDWARD E. GRAY.